United States Patent
Andersen et al.

(10) Patent No.: US 7,268,937 B1
(45) Date of Patent: Sep. 11, 2007

(54) HOLOGRAPHIC WAVEFRONT SENSOR

(75) Inventors: Geoff P. Andersen, Colorado Springs, CO (US); Randy Reibel, Bozeman, MT (US)

(73) Assignee: United States of America as Represented by the Secretary of the Air Force, Washington, DC (US)

( * ) Notice: Subject to any disclaimer, the term of this patent is extended or adjusted under 35 U.S.C. 154(b) by 141 days.

(21) Appl. No.: 11/138,727

(22) Filed: May 27, 2005

(51) Int. Cl.
G02B 5/32 (2006.01)
(52) U.S. Cl. .............................. 359/359; 16/19; 16/569
(58) Field of Classification Search ................... 359/15, 359/19, 569
See application file for complete search history.

(56) References Cited

U.S. PATENT DOCUMENTS

| | | | |
|---|---|---|---|
| 4,141,615 A | 2/1979 | Takeuchi et al. | |
| 4,399,356 A | 8/1983 | Feinleib et al. | |
| 4,474,467 A | 10/1984 | Hardy et al. | |
| 4,701,005 A | 10/1987 | Noguchi | |
| 4,725,138 A | 2/1988 | Wirth et al. | |
| 5,410,397 A * | 4/1995 | Toeppen | 356/121 |
| 5,671,073 A | 9/1997 | Psaltis et al. | |
| 5,912,731 A | 6/1999 | DeLong et al. | |
| 5,936,720 A | 8/1999 | Neal et al. | |
| 6,052,180 A | 4/2000 | Neal et al. | |
| 6,130,419 A | 10/2000 | Neal | |
| 6,184,974 B1 | 2/2001 | Neal et al. | |
| 6,199,986 B1 | 3/2001 | Williams et al. | |
| 6,220,707 B1 * | 4/2001 | Bille | 351/212 |
| 6,271,915 B1 | 8/2001 | Frey et al. | |
| 6,299,311 B1 | 10/2001 | Williams et al. | |
| 6,396,588 B1 | 5/2002 | Sei | |
| 6,552,808 B2 * | 4/2003 | Millerd et al. | 356/521 |
| 6,630,656 B2 | 10/2003 | Wirth | |
| 6,781,681 B2 | 8/2004 | Horwitz | |
| 2006/0256321 A1 * | 11/2006 | Dolne et al. | 356/121 |

OTHER PUBLICATIONS

R.J. Noll, "Zernike Polynomials in Atmospheric Turbulence", J. Opt. Soc. Am., 1976, vol. 66, pp. 207-211.
F. Roddier, "Curvature Sensing and Compensation: A New Concept in Adaptive Optics", Appl. Opt., 1988, vol. 27, pp. 1223-1225.
B. Robertson et al., "Hybrid Kinoform Fanout Holograms in Dichromated Gelatin", Appl. Opt. 1991, vol. 30, pp. 3711-3720.
I. Biaggio et al., "Optical Correlator that Uses Cesium Vapor", Opt. Lett. 1994, vol. 19, pp. 1765-1767.
I. Biaggio et a l., "Optical Image Processing by an Atomic Vapor", Nature, 1994, vol. 371, pp. 318-371.
R. Ragazzoni, "Pupil Plane Wavefront Sensing with an Oscillating Prism", J. Mod. Opt., 1996, vol. 43, pp. 289-293.

(Continued)

*Primary Examiner*—Fayez G. Assaf
(74) *Attorney, Agent, or Firm*—AFMCLO/JAZ; Jeffrey R. Moore

(57) ABSTRACT

A holographic wavefront sensor inclusive of a multiplexed hologram that can reconstruct one or more diffracted beams from a single object or input beam onto a distant image plane. The position of the reconstructed beams on the distant image plane indicates the relative amounts of different aberrations present in the input beam. Optical and computer realization of the employed hologram are accomplished along with sensor configurations in simple and more complex uses.

18 Claims, 3 Drawing Sheets

OTHER PUBLICATIONS

J. Primot et al., "Wavefront Sensor Prototype for Indistrial Applications Based on a Three-Level Phase Grating", Appl. Opt., 1997, vol. 36, pp. 901-904.

P. Blanchard et al., "Simultaneous Multiplane Imaging with a Distorted Diffraction Grating", Appl. Opt., 2000, vol. 38, pp. 6649-6655.

M. Neil et al., "Closed-Loop Aberration Correction by Use of a Modal Zernike Wave-Front Sensor", Opt. Lett., 2000, vol. 25, pp. 1083-1085.

P. Blanchard et al., "Phase-Diversity Wave-Front Sensing with a Distorted Diffraction Grating", Appl. Opt., 2000, vol. 29, pp. 6649-6645.

C. Verinaud et al, "Adaptive-Optics Correction of a Stellar Iinterferometer with a Single Pyramid Wave-Front Sensor", Opt. Lett., 2002, vol. 27, pp. 470-472.

L. Poyneer et al., "Fast Wave-Front Reconstruction in Large Adaptive Optics Systems with the Use of the Fourier Transform", J. Opt. Soc. Am., 2002, vol. A 19, pp. 2100-2111.

M. Neil et al., "New Modal Wave-Front Sensor: Application to Adaptive Confocal Fluorescence Microscopy and Two-Photon Excitation Fluorescence Microscopy", J. Opt. Soc. Am., 2002, vol. A 19, pp. 2112-2120.

J. Dolne et al., "Practical Issues in Wave-Front Sensing by Use of Phase Diversity", Appl. Opt., 2003, vol. 42, pp. 5284-5289.

S. Restaino et al., "Analysis of the Naval Observatory Flagstaff Station 1-m Telescope Using Annular Zernike Polynomials", Appl. Opt., 2003, vol. 42, 2491-2495.

J. Son et al., "Shack-Hartmann Wavefront Sensor with Holographic Memory", Opt. Eng., 2003, vol. 42, pp. 3389-3398.

J. Rha et al., "Reconfigurable Shack-Hartmann Wavefront Sensor", Opt. Eng., 2004, vol. 43, pp. 251-256.

Y. Kim et al., "Storage of Multiple Holograms of Equal Diffraction Efficiency in a Phase-Code Multiplexing System", Appl. Opt., 2004, vol. 43, pp. 2118-2124.

W. Shu et al., "Enhancement of the Angular Selectivity in Encrypted Holographic Memory", Appl. Opt., 2004, vol. 43, pp. 2298-2304.

C. Sheppard et al., "Zenrike Expansion of Separable Function of Certesian Coordiates", Appl. Opt., 2004, vol. 43, pp. 2963-2966.

R. Clare et al., "Phase Retrieval from Subdivision of the Focal Plane with a Lenslet Array", Appl. Opt., 2004, vol. 43, pp. 4080-4087.

M. Shahriar et al., "Shared-Hardware Alternating Operation of a Super-Parallel Holographic Optical Correlator and a Super-Parallel Holographic Random Access Memory", Opt. Eng., 2004, vol. 43, pp. 1856-1861.

* cited by examiner

HOLOGRAPHIC WAVEFRONT SENSOR

RIGHTS OF THE GOVERNMENT

The invention described herein may be manufactured and used by or for the Government of the United States for all governmental purposes without the payment of any royalty.

BACKGROUND OF THE INVENTION

An extremely spherical (or flat) wavefront is needed for diffraction-limited (i.e., perfect) optical imaging; a wavefront with phase errors less than a quarter of a wavelength is generally desired in such usage. In most instances, however, such imaging is less than perfect due to phase distortions present in the final wavefront. For example, when viewing scenes through the atmosphere, variations in refractive index due to pockets of hot and cold air can distort a wavefront significantly, blurring images and limiting the resolution. Adaptive optics is a technique which can correct for these aberrations3,4. (Numbers such as these refer to the list of references included at the close of this specification. Each reference in this list is hereby incorporated by reference herein.) The adaptive optics process involves detecting the shape of a distorted wavefront and then applying the inverse error to return the wavefront to a perfect surface.

Wavefront sensors are devices capable of determining how the phase of the observed wave differs from a perfectly flat or spherical ideal wavefront. In typical cases of wavefront analysis, the wavefront sensors are designed to extract phase information that is generally then reduced into complex mathematical terms. With such complex formulae, intensive computations are often required to dynamically characterize the wavefront. Such wavefronts may however change very rapidly. In the case of an adaptive optics application such as a telescope, such calculations may need to be performed hundreds of times a second for thousands of points over the wavefront. Such calculations require dedicated circuitry and/or extremely fast data processors.

There are several different techniques which have been developed for wavefront sensing. Some of the more commonly adopted methods include:

An interferometric sensor (IS): interferometry is a means of extracting phase information by mixing one wavefront with another and using the difference signal as a measure of wavefront error[1]. The result is usually some form of contour map of the surface of the wavefront. This map can be analyzed to give an absolute phase measurement. The general process can be divided into two possibilities:

Phase mixing with a "reference" wave. In this case, an interference pattern is produced by combining the unknown wavefront with a wavefront of predetermined phase (typically a diffraction-limited plane wave). The unknown wavefront can be determined by finding the difference between the two. This technique is primarily useful for coherent wavefront sources or extremely bright incoherent sources.

Self referencing. In this case the unknown wavefront is divided into two beams—one of which is modified (e.g. being shifted laterally) before being recombined. The interference can then be analyzed to determine the global phase of the original beam. A pyramidal sensor[11,17] is one example of a wavefront sensor using this technique. U.S. Pat. No. 4,474,467 discloses an example of this type of wavefront sensor; this patent and each of the other patents identified in this document is hereby incorporated by reference herein.

A Shack-Hartmann-type Wavefront Sensor (SHWFS)[6,18,22,23,27]: this is a method by which a wavefront is divided into small sections (either using holes or lenslets or micromirrors). The local slope of the wavefront over each subaperture used is calculated (e.g. by focal shift). With the assumption of continuity, the final wavefront is generated by piecing together the slopes of each sub-aperture. Several variations of this type of sensor are included in U.S. Pat. Nos. 4,141,651, 4,399,356, 4,725,138, 5,493,391, 5,912,731, 5,936,720, 6,052,180, 6,130,419, 6,184,974, 6,199,986, 6,299,311 and 6,396,588.

A Phase Diversity Sensor (PDS)[7,13-16,20,21]: this method requires the unknown wavefront to be imaged at two planes in the vicinity of the pupil of the instrument. By analyzing the differences in the two beam profiles, the initial wavefront error can be determined. Many different methods have been discovered to produce and analyze the wavefront using this technique. These include curvature sensors based on a simple focusing of the beam with a conventional lens, as well as more complex sensors involving diffraction gratings.

The latter two Phase Diversity Sensor methods are generally considered when referring to "wavefront sensors" as they can operate equally well on beams of coherent or incoherent light as well as at light levels much lower than those required for interferometry. However, there are resolution limits on wavefront sensing, and it is computationally intensive to determine an entire surface map of the wavefront. Ideally one would like to have a method of sampling wavefronts at high resolution and low light levels with minimal computational requirements to permit operation at high speeds (large bandwidths). The present invention introduces a completely new method for analyzing a wavefront.

SUMMARY OF THE INVENTION

The present invention discloses a holographic wavefront sensor (HWFS) capable of analyzing an entire wavefront at once (a so-called zonal detector) using a holographic diffraction grating or hologram. The sensor consists of a diffractive optical element (the hologram) that is fabricated (or "programmed") with every possible phase aberration in advance. In operation, a wavefront incident on the hologram will be divided into multiple output beams according to the presence and strength of particular aberrations present in the input wavefront. The invention permits the instant readout of the wavefront information with no computations being required. As a result, an arbitrary wavefront can be reconstructed to a higher degree of precision, and at much higher rates than are possible with other wavefront sensors. In effect this represents a massively parallel optical processing method with virtually limitless bandwidth. Furthermore, because there are no calculations required (in the form of complex computers and electronics) this type of sensor is compact and permits active image correction for very small imaging devices. The holographic wavefront sensor also operates at low light levels on incoherent or coherent wavefronts.

It is therefore an object of the present invention to provide a wavefront sensor that analyzes an entire wavefront at one time by using a hologram.

It is another object of the invention to provide a holographic wavefront zonal detector.

It is another object of the invention to provide a mathematical computation free wavefront sensor.

It is another object of the invention to provide a high-speed wavefront sensor.

It is another object of the invention to provide a high speed method for analyzing an optical wavefront.

It is another object of the invention to provide a high bandwidth wavefront sensor.

It is another object of the invention to provide a holographic wavefront sensor capable of operating at low light levels on incoherent or coherent wavefronts.

It is another object of the invention to provide a wavefront correction hologram that is fabricated or programmed in advance to accommodate a plurality of phase aberrations.

These and other objects of the invention will become apparent as the description of the representative embodiments proceeds.

These and other objects of the invention are achieved by the method of generating a wavefront-corrected optical output image from a phase-aberrated input optical image, said method comprising the steps of:

forming an image representing said phase-aberrated input optical image on an input port surface of a phase correction holographic diffraction grating having a plurality of differing wavefront phase aberration-related holographic patterns representing differing wavefront aberrations and differing wavefront aberration strengths included therein;

collecting a plurality of output image component beams from an output port surface of said phase correction hologram onto physically dispersed locations of an output image-receiving detector;

reconstructing said input optical image in phase aberration-reduced optical output image form from said dispersed output image components.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION

Figure 1:
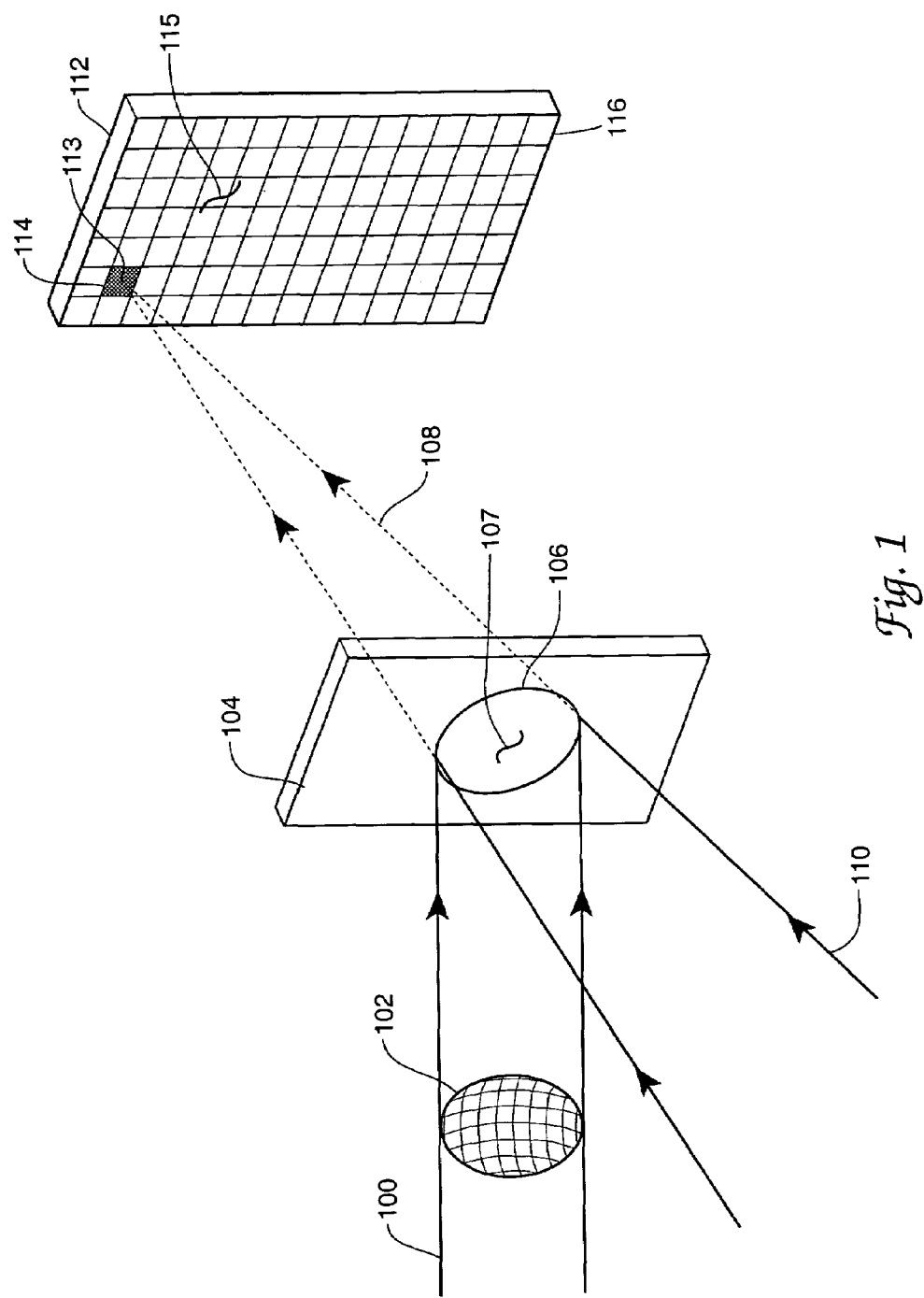
FIG. 1 shows an arrangement for recording the hologram of a simplified holographic wavefront sensor in accordance with the present invention.

A simplified schematic diagram to accomplish the optical recording of a hologram is shown in the drawing of FIG. 1. The hologram in the FIG. 1 case has a single input/object beam 100 having a given phase aberration pattern 102 that is to be removed in accordance with the present invention. This is to say the aberration 102 of the FIG. 1 input beam can be represented by a single, unique Zernike term and coefficient combination ($Z_0$, $A_0$), where $Z_0$ represents the Zernike term and $A_0$ represents the strength of that term. Zernike terms and Zernike polynomials are known in the optical art and are briefly addressed in subsequent paragraphs herein.

A hologram as shown at 106 in the FIG. 1 drawing can be created by combining the input object beam 102 with a coherent reference beam 110. Where these two beams overlap as in the FIG. 1 region 107, a hologram 106 is recorded within the light sensitive holographic medium or holographic substrate 104. Note that the focused reference beam 110 used here has been specifically arranged such that it will naturally produce a focused spot 104 on the surface 115 of a distant detector 112 at the specific location 114.

The present invention holographic wavefront sensor therefore may be considered to consist of two parts:

A pre-recorded, multiplexed hologram;

A detector to register the locations of reconstructed beams received from this detector.

Moreover the desired hologram has the property that it will diffract a beam with a given wavefront error into a specific location on an arrayed detector. If the incident beam has more than one error present, then more than one diffracted beam will be created—each beam representing the type and strength of each aberration present.

Figure 2:
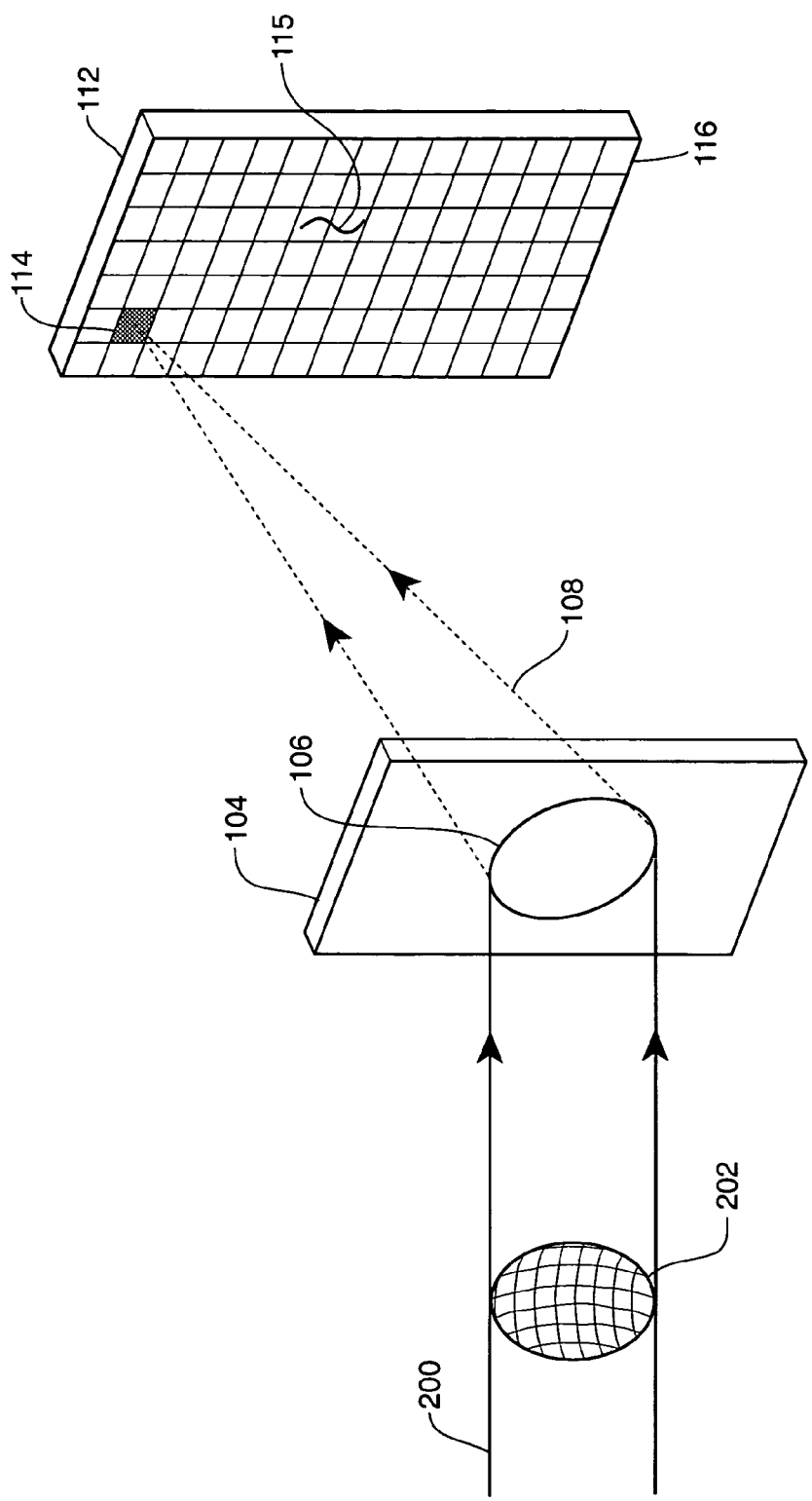
FIG. 2 shows the operating principle of a holographic wavefront sensor in accordance with the present invention.

Once written, the FIG. 1 hologram can be used to determine if the aberration 102 is present in an arbitrary input beam. Such use of the hologram (otherwise known as the reconstruction of the hologram) is shown in the drawing of FIG. 2 herein. In FIG. 2 the location and orientation of the arbitrary input beam 200, hologram 206 and detector 112 are all kept as they were during the FIG. 1 recording process. Moreover in FIG. 2 drawing elements relating to the FIG. 1 hologram fabrication retain their FIG. 1 identities and elements relating to new elements in the FIG. 2 scene are provided with new identification numbers. In keeping with this convention, the input beam 200 in FIG. 2 is provided with the new identity 200 since it may actually contain new aberrations however the output beam 108 is maintained with its FIG. 1 identity since it has been found in the holographic examination process to contain the same aberration and therefore falls on the same detector location 114 as is shown in the FIG. 1 drawing.

As shown in the FIG. 2 drawing therefore a portion of the input beam 200 diffracts from the hologram 106 to reconstruct the original reference beam used in the recording process. This reconstructed beam 108 produces a focused spot at the expected location 114 on the distant detector 112. If the original FIG. 1 aberration is not present in the input beam 200, no portion of this beam will diffract to the location 114 on the detector 112. Thus it is possible use this mechanism to tell if the recorded aberration ($Z_0$, $A_0$) is present in an input beam by looking for a bright detection spot at the specific detector location 114.

In view of the several references to Zernike polynomials and the Zernike coefficients $Z_0$, $A_0$ in the preceding paragraphs it appears warranted to divert momentarily from discussion of the FIG. 1 and FIG. 2 drawings and the present invention to provide a cursory discussion of Zernike characterizations of an image. To this end, it is useful to appreciate that the operation of a holographic wavefront sensor can be described by considering the aberrations of a given input beam in terms of a specific Zernike polynomial[1, 3-5, 27] that may be used to characterize an involved wavefront. Zernike polynomials are a mathematical method for describing the phase of a wave by breaking it into various "modes" or polynomials, starting from broad low-order variations up to unlimited detail in the higher order polynomial terms. For an aperture with a circular cross-section, any wavefront may be characterized as a combination of Zernike polynomials ($Z_{nm}$) with a given coefficient ($A_{nm}$) representing the "strength" of each particular aberration.

In Zernike terms the magnitude of the departure of a wave from a plane surface at any radial distance r, and angular location q, is W(r,q) and is given by:

$$W(\rho, \theta) = \sum_{n=0}^{k} \sum_{m=0}^{n} A_{nm} Z_{nm} \quad (1)$$

where k is the order of the polynomial, $n, m \geq 0$ and $m \leq n$. This formalism results in a series of linear polynomials as shown in Table 1 that can fully describe any wavefront to any degree of precision. As an example of Zernike polynomial usage one type of astigmatism is actually describable as a third order Zernike term: $W(r,q)=r^2 \cos(2q)$. Similarly, one can obtain expressions for other well known aberrations such as defocus, spherical aberration, tilt and coma, etc. Each aberration has its own mathematical description and the final wavefront can be found by adding each aberration together along with the aberration relative strength. For example, a wavefront may be fully described by adding half a wave of $3^{rd}$ order spherical aberration ($0.5Z_{42}$) together with two and one fifth waves of coma ($2.2Z_{31}$). In practice, however, polynomials up to much higher orders are used—though where one decides to draw a limit on still higher order terms is entirely arbitrary (and usually depends on computing power or limits on detection or correction). Note that while Zernike polynomials have been discussed here, there are many other mathematical descriptions for wavefronts, some of these for example are better suited to square apertures. This present discussion is not however intended to limit the operation of our invention to Zernike formulism. Zernike description simply provides a convenient basis for discussion of present invention operation.

TABLE 1

A list of the first ten Zernike polynomials.

| n | m | Zernike Polynomial ($Z_{nm}$) |
|---|---|---|
| 0 | 0 | 1 |
| 1 | 0 | $\rho\sin\theta$ |
|   | 1 | $\rho\cos\theta$ |
| 2 | 0 | $\rho^2\sin2\theta$ |
|   | 1 | $2\rho^2 - 1$ |
|   | 2 | $\rho^2\cos2\theta$ |
| 3 | 0 | $\rho^3\sin3\theta$ |
|   | 1 | $(3\rho^3 - 2\rho)\sin\theta$ |
|   | 2 | $(3\rho^3 - 2\rho)\cos\theta$ |
|   | 3 | $\rho^3\cos3\theta$ |

A hologram is a diffractive optical element in which one input (or object) beam will diffract into one or more reconstructed beams. The present invention wavefront sensor requires a hologram specifically programmed with all expected aberrations and all possible strengths of each aberration. Such a hologram can be made using real optical beams or generated by computer and printed onto a substrate. U.S. Pat. No. 5,671,073 describes one arrangement for making such a hologram; the invention of this patent was accomplished with the aid of certain government funding and has been incorporated by reference herein in a preceding paragraph. The process used in hologram fabrication is irrelevant to operation of the hologram. In order to best describe the present invention, we elect to discuss sensor operation in terms of an optically fabricated grating. This discussion begins with use of a hologram in detecting a single aberration of a particular magnitude. The discussion is then extended to demonstrate how any aberration of any strength may be detected by a more complex device.

A schematic to accomplish the optical recording of a hologram is shown in the drawing of FIG. 1. The hologram in this instance has a single input/object beam 100 with a given aberration 102. In Zernike language the aberration 102 of input beam 100 can be represented by a single Zernike term and coefficient combination, ($Z_0$, $A_0$) where $Z_0$ represents the Zernike term and $A_0$ represents the strength of that term. A hologram can be created by combining the object beam 100 with a coherent reference beam 110 as shown in FIG. 1. Where these two beams overlap at 107 a hologram is recorded within the light sensitive substrate 104. Note that the focused reference beam 110 used here has been specifically aligned such that it will naturally produce a focused spot 113 on a distant detector 116 at a specific location 114.

The FIG. 1 and FIG. 2 description recited herein is a simple example describing how a hologram can be used to detect a single aberration of a particular strength. To create a practical or modal wavefront-sensing device, one may utilize a plurality set of such holograms where each hologram has recorded a different aberration. The arbitrary input beam passes through the first hologram, identifying the amount of the first aberration on the first detector, then the non-deflected portion of the input beam is made to pass through the second hologram, identifying the amount of the second aberration on a second detector, and so on, until all aberrations of interest have been identified. The second hologram can be recorded on a separate medium, which is laid against the first hologram, or recorded in the same material as the first as a spatial mode multiplexed hologram. Such multiplexed holograms are known in the art for many purposes[8-10,24,25,28] and have been employed for other uses as is described for example in U.S. Pat. Nos. 4,701,005 and 5,671,073.

Figure 3:
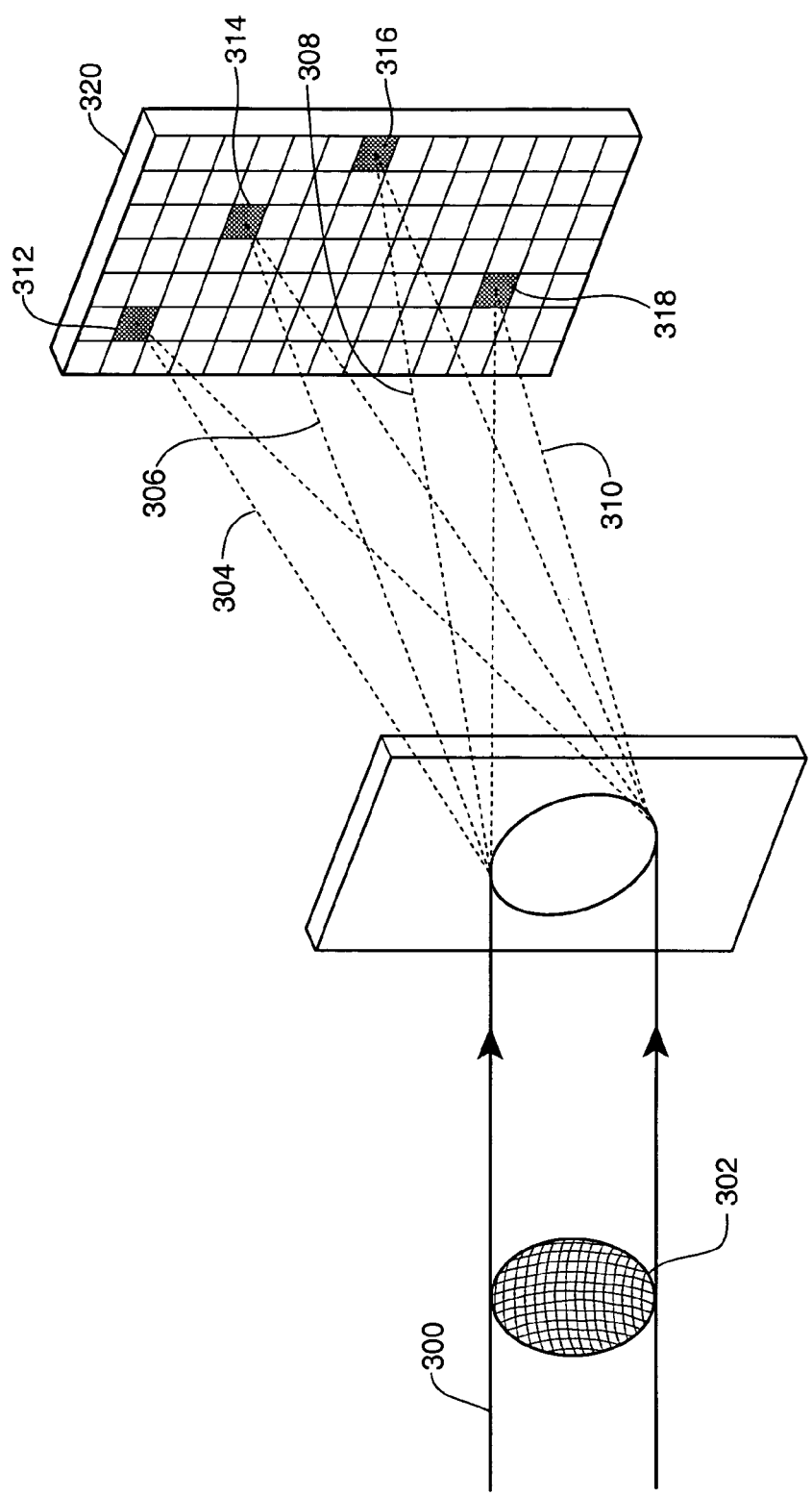
FIG. 3 shows a more general embodiment of a wavefront sensor in accordance with the present invention.

In the present invention instance however, the multiplexed hologram is constructed in such a way that each possible combination of aberration and coefficient ($Z_{nm}$, $A_{nm}$) can be detected. In the case of an optically constructed hologram, this requires the reference beam to be angled slightly differently for each newly recorded aberration. In this way, each aberration has its own reference beam to reconstruct to produce a focal spot at a unique location on the distant screen. This arrangement is shown in the drawing of FIG. 3. In FIG. 3 a single input beam 300 with an arbitrary wavefront error at 302, an error consisting of many different aberrations, reconstructs many reference beams 304, 306, 308, 310 each focusing to particular points 312, 314, 316 and 318 on a distant arrayed detector 320 to indicate which aberrations are present.

This ability to separate out and categorize the amount of each aberration is the basis for the operation of the present invention holographic wavefront sensor. Any wavefront can be mathematically described as a linear sum of a known aberration functions (such as a Zernike polynomial term, $Z_{nm}$) with some strength coefficient ($A_{nm}$) as a multiplying factor. These various possibilities can be arranged in matrix form as shown in Table 2, below. From this table, a full description of a wavefront can be made as a linear sum of each term and their relative strengths (up to ±2 waves magnitude in this case). Table 2 represents a desirable data organization; the presence of actual data in this organization is deferred until FIG. 3.

TABLE 2

A matrix representation of possible Zernike terms and aberration coefficients describing the state of a wavefront.

|   |     | Aberration coefficient, $A_{nm}$ (in waves) |   |   |   |   |   |   |   |
|---|-----|-----|-----|-----|-----|-----|-----|-----|-----|
|   |     | 2.0 | 1.5 | 1.0 | 0.5 | 0.5 | 1.0 | 1.5 | 2.0 |
| Zernike term: $Z_{nm}$ | 0,0 |     |     |     |     |     |     |     |     |
|   | 1,0 |     |     |     |     |     |     |     |     |
|   | 1,1 |     |     |     |     |     |     |     |     |
|   | 2,0 |     |     |     |     |     |     |     |     |
|   | 2,1 |     |     |     |     |     |     |     |     |
|   | 2,2 |     |     |     |     |     |     |     |     |

In the present invention the hologram is arranged such that the reconstructed reference beams will provide an indication of the presence of a certain amount of each aberration by spatial location of focal spots on the detector. For example, if the detector is a charge coupled device, a CCD, the matrix element ($Z_{nm}$, $A_{nm}$) will be indicated by the presence of a bright spot on a particular pixel. In the Table 3 below the Table 2 data organization is represented in a form suggesting it represents an actual charge coupled device structure. This drawing shows how the CCD detects light in various cells (lighted cells here denoted by an "X"), in the presence of a certain amount of a particular aberration.

TABLE 3

A table showing how the spatial location of illuminated CCD pixel elements (crosses) could be used to determine the entire wavefront aberration.

| | Strength of aberration, $A_{nm}$ (in waves) | | | | | | | |
|---|---|---|---|---|---|---|---|---|
| | 2.0 | 1.5 | 1.0 | 0.5 | 0.5 | 1.0 | 1.5 | 2.0 |
| 0, 0 | | | | | | | | |
| 1, 0 | | | | | | | | X |
| 1, 1 | | | | | X | | | |
| 2, 0 | | | | | | | | |
| 2, 1 | | | X | | | | | |
| 2, 2 | | | | | | | | |

In the FIG. 3 example, the wavefront error is: $W(r,q)=2Z_{1,0}+0.5Z_{1,1}-Z_{2,1}$. Note that for this error example, the Zernike terms are limited to second order types and the precision limited to just 0.5 wave steps over a range of −2.0 to 2.0 waves magnitude. In practice, the hologram may be programmed to indicate the presence of an arbitrary degree of Zernike terms to any degree of precision over any desired range of magnitudes—this simply requires a larger detector and a more complex hologram.

An advantage of the present invention holographic wavefront sensor is that once the hologram and detector combination are created and calibrated the device handles the detection and characterization of wavefront errors automatically. This eliminates the need to perform processor intensive wavefront expansions that are required to correlate the wavefront errors typically found in other types of wavefront sensors such as the Shack-Hartmann sensor. In other words, a direct readout of the locations and intensities of the multiple focal points produced by the device described herein provides the necessary information to determine the state of the wavefront up to an arbitrary degree of precision. By eliminating the processor intensive calculations required by these other approaches, the present invention wavefront sensor can be made to operate on a much faster time scale allowing for device operation in regimes of heavy turbulence or in other scenarios where fast wavefront analysis is required. Another potential advantage of the present invention is the reduction in size, complexity, and cost of the overall wavefront as a result of the removal of multiple, fast front end processors when compared to other devices.

Arrangements, Choices

Alternate arrangements for parts of the present invention exist. Some of these may be identified as follows.

The Hologram

There are many types of hologram, many methods for recording them and many variations in the ways the wavefront sensor can be configured. Some of these variations include:

Wavelength. Holograms can be created at virtually any wavelength in the electromagnetic spectrum, wavelength multiplexed holograms may also be used for the present invention.

Grating form. The hologram is a diffraction grating; a diffraction grating in the possible form of phase, a relief, spatial-spectral or an intensity grating. Any of these possibilities is acceptable as a variation without affecting the basic operation of the invention.

Media. Holograms can be created in numerous forms of media, including liquid crystal displays, photorefractive crystals, glasses and polymers, liquids, gasses, metal substrates, photographic film and gelatins to name a few.

Hologram type. Holograms can operate in either reflection or transmission modes. The present invention holographic wavefront sensor has been described in terms of a transmission hologram, it can also operate with a reflective hologram.

Hologram fabrication. The wavefront sensor is disclosed in terms of an optically addressed hologram for simplicity. Holograms created by optical, mechanical and computer generated processes are feasible.

Dynamic holograms. Computer generated holograms in dynamic media such as liquid crystal displays, photorefractive materials and spatial-spectral holograms can be used to continually change the way in which light is diffracted. A temporal grating may be used as the basis of the hologram, in cases where the wavefront sensor is required to be sensitive to different aberrations over time.

Multiple holograms. A combination of multiple holograms can be used to act like a single multiplexed hologram. For example, it may be preferable to have individual aberrations recorded in different thin holograms. With a stack of these holograms on top of one another, they can be made to act as a single diffractive element—each one diffracting light from their specific component to the calibrated detector location. As a whole, these combined elements may act in the same way as the single element described.

The Detector

We have described the operation of the invention in terms of a single pixilated CCD. Successful operation with other detectors such as photographic films or electronically readable media including (but not limited to) charge-coupled devices (CCDs) and complementary metal-oxide-silicon (CMOS) detectors, diodes or photomultipliers tubes (PMTs) is plausible.

Mathematical Formulism

For explaining operation of the holographic wavefront sensor, the Zernike formulism has been used to mathematically describe the state of an arbitrary wavefront. In principle, however, any system of linear equations may be used equally well—so long as the hologram is fabricated in advance such that it will diffract light according to the presence of the particular mode or polynomial order the user wishes to detect. Other possibilities formalisms include Legendre polynomials, Fourier series and Bessel functions.

Input Beam

Certain modifications to the design of the holographic wavefront sensor can permit operation in the presence of differing input beam properties.

Cross-section and fill-factor. In the case shown in FIG. 3 herein, the input beam has a circular, filled cross-section. This is not a requirement, and a beam with any cross-section (square, elliptical etc) could be used. Furthermore, the input beam can have an arbitrary obscuration or fill-factor, so long as the hologram has been constructed to match the expected form of the input wavefront.

Polarization. Interferometric wavefront sensors will not operate if the two combined wavefronts do not have matching polarizations. In certain situations the present invention wavefront sensor can be made to be either insensitive or sensitive to polarization, so both polarized and unpolarized input wavefronts may be analyzed equally effectively as well as allowing determination of the wavefront on the basis of polarization.

Intensity profile. The present invention holographic wavefront sensor can operate with an input having any arbitrary intensity profile (i.e. Gaussian, super-Gaussian, Top-hat etc) but for best operation, it appears advisable to provide the hologram with the same specifications that the input beam is expected to have during operation.

Alternative Designs/Modes of Operation

Beam Profiling

The wavefront sensor described heretofore discloses a wavefront sensor sensitive to Zernike polynomial deconvolution of a wavefront. Another use of the invention would be as a beam profiler, for laser beams where we need to know the type of modes present in a laser beam. A Gaussian beam can be fully described as a combination of transverse mode frequencies $\mu_{qmn}$, where:

$$v_{qmn} = \frac{c}{2l}\left[q + \frac{1}{\pi}(m+n+1)\cos^{-1}\sqrt{g_1 g_2}\right] \quad (2)$$

where $g_1$, $g_2$ and $l$ are calculated from the resonator design. By calibrating a hologram to detect transverse modes (instead of Zernike terms as above), we can use this holographic wavefront sensor as a beam profiler for Gaussian laser beams. Unlike conventional beam profilers, the holographic wavefront sensor can operate at high speeds making it possible to diagnose real-time effects such as thermal lensing on laser beams.

While the apparatus and method herein described constitute a preferred embodiment of the invention, it is to be understood that the invention is not limited to this precise form of apparatus or method and that changes may be made therein without departing from the scope of the invention, which is defined in the appended claims.

REFERENCES

1. D. Malacara, "Optical Shop Testing $2^{nd}$ Ed.," Wiley-Interscience Press (1992).
2. P. Hariharan, "Optical Holography $2^{nd}$ Ed.," Cambridge Press (1996).
3. R. Dyson, "Principles of Adaptive Optics $2^{nd}$ Ed.," Academic Press (1998).
4. F. Roddier, "Adaptive Optics in Astronomy," Cambridge Press (1999).
5. R. J. Noll, "Zernike polynomials in atmospheric turbulence," J. Opt. Soc. Am. 66 207-211 (1976).
6. R. Hudgin, "Wave-front reconstruction for compensated imaging," J. Opt. Soc. Am. 67 375-382 (1977).
7. F. Roddier, "Curvature sensing and compensation: a new concept in adaptive optics," Appl. Opt. 27 1223-1225 (1988).
8. B. Robertson et al., "Hybrid kinoform fanout holograms in dichromated gelatin," Appl. Opt. 30 3711-3720 (1991).
9. I. Biaggio et al., "Optical correlator that uses cesium vapor," Opt. Lett. 19 1765-1767 (1994).
10. I. Biaggio et al., "Optical image processing by an atomic vapor," Nature 371 318-371 (1994).
11. R. Ragazzoni, "Pupil plane sensing with an oscillating prism," J. Mod. Opt. 43 289-293 (1996).
12. J. Primot et al., "Wavefront sensor prototype for industrial applications based on a three-level phase grating," Opt. Eng. 36 901-904 (1997).
13. P. Blanchard and A. Greenaway, "Simultaneous multi-plane imaging with a distorted diffraction grating," Appl. Opt. 38 6692-6699 (1999).
14. M. Neil et al., "New modal wave-front sensor: a theoretical analysis," J. Opt. Soc. Am. A 17 1098-1107 (2000).
15. M. Neil et al., "Closed-loop aberration correction by use of a modal Zernike wave-front sensor," Opt. Lett. 25 1083-1085 (2000).
16. P. Blanchard et al., "Phase-diversity wave-front sensing with a distorted diffraction grating," Appl. Opt. 39 6649-6655 (2000).
17. C. Verinaud and S. Esposito, "Adaptive-optics correction of a stellar interferometer with a single pyramid wave-front sensor," Opt. Lett. 27 470-472 (2002).
18. L. Poyneer et al., "Fast wave-front reconstruction in large adaptive optics systems with the use of the Fourier transform," J. Opt. Soc. Am. A 19 2100-2111 (2002).
19. M. Booth et al., "New modal wave-front sensor: application to adaptive confocal fluorescence microscopy and two-photon excitation fluorescence microscopy," J. Opt. Soc. Am. A 19 2112-2120 (2002).
20. J. Dolne et al., "Practical issues in wave-front sensing by use of phase diversity," Appl. Opt. 42 5284-5289 (2003).
21. S. Restaino et al., "Analysis of the Naval Observatory Flagstaff Station 1-m telescope using annular Zernike polynomials," Appl. Opt. 42 2491-2495 (2003).
22. J. Son et al., "Shack-Hartmann wavefront sensor with holographic memory," Opt. Eng. 42 3389-3398 (2003).
23. J. Rha et al., "Reconfigurable Shack-Hartmann wave-front sensor," Opt. Eng. 43 251-256 (2004).
24. Y. Kim et al., "Storage of multiple holograms of equal diffraction efficiency in a phase-code multiplexing system," Appl. Opt. 43 2118-2124 (2004).
25. W. Shu and C. Lin, "Enhancement of the angular selectivity in encrypted holographic memory," Appl. Opt. 43 2298-2304 (2004).
26. C. Sheppard et al., "Zernike expansion of separable function of Cartesian coordinates," Appl. Opt. 43 3963-3966 (2004).
27. R. Clare and R. Lane, "Phase retrieval from subdivision of the focal plane with a lenslet array," Appl. Opt. 43 4080-4087 (2004).
28. M. Shahriar et al., "Shared-hardware alternating operation of a super-parallel holographic optical correlator and a super-parallel holographic random access memory," Opt. Eng. 43 1856-1861 (2004).

We claim:

1. A light wavefront phase aberration correction apparatus comprising the combination of:
   a phase correction holographic diffraction grating inclusive of a plurality of differing wavefront phase aberration-related holographic entries each representative of one of a differing wavefront aberration and a different wavefront aberration strength;
   the phase correction holographic diffraction grating programmed with all expected wavefront aberrations and all expected aberration strengths needed to achieve a selected degree of precision;
   a phase aberrated input image apparatus generating a phase aberrated input optical image at an input port of said phase correction holographic diffraction grating for each wavefront aberration; and
   an output image detector apparatus receiving a plurality of physically dispersed correctively reconstructed input image component beams from an output port of said phase correction holographic diffraction grating, the output image detector apparatus designed to analyze the entire light wavefront at once.

2. The light wavefront phase aberration correction apparatus of claim 1 wherein said output image detector apparatus includes an electronic retina element.

3. The light wavefront phase aberration correction apparatus of claim 2 wherein said electronic retina element comprises a charge coupled device array.

4. The light wavefront phase aberration correction apparatus of claim 1 wherein said holographic diffraction grating is one of a phase relief, a spatial-spectral and an intensity grating configuration and also comprises one of a reflection mode hologram and a transmission mode hologram.

5. The light wavefront phase aberration correction apparatus of claim 1 wherein said holographic diffraction grating is generated in a dynamic media.

6. The light wavefront phase aberration correction apparatus of claim 1 wherein said holographic diffraction grating is comprised of one of a single multiplexed hologram and a stacked plurality of individual holograms.

7. The light wavefront phase aberration correction apparatus of claim 1 wherein said holographic diffraction grating is comprised of holographic images each made with a reference beam of different angular orientation.

8. The light wavefront phase aberration correction apparatus of claim 1 wherein said holographic diffraction grating includes output image spatial location determination components identifying magnitude and type of aberration present in said phase aberrated input optical image.

9. The light wavefront phase aberration correction apparatus of claim 1 wherein the expected wavefront aberrations and the expected aberration strengths needed to achieve a selected degree of precision are at least described in terms of a Zernike polynomial aberration type, $Z_{nm}$, and an aberration magnitude coefficient, $A_{nm}$.

10. A method of generating a wavefront-corrected optical output image from a phase-aberrated input optical image, said method comprising the steps of:

forming an image representing said phase-aberrated input optical image on an input port surface of a phase correction holographic diffraction grating having a plurality of differing wavefront phase aberration-related holographic patterns representing differing wavefront aberrations and differing wavefront aberration strengths included therein;

collecting a plurality of output image component beams from an output port surface of said phase correction hologram onto physically dispersed locations of an output image-receiving detector; and reconstructing said input optical image in phase aberration-reduced optical output image form from said dispersed output image components.

11. The method of generating a wavefront-corrected optical output image from a phase-aberrated input optical image of claim 10 wherein said collecting step includes receiving output image components at specific pixel locations of an electronic charge coupled device array.

12. The method of generating a wavefront-corrected optical output image from a phase-aberrated input optical image of claim 10 wherein said phase correction holographic diffraction grating having a plurality of differing wavefront phase aberration-related holographic patterns representing differing wavefront aberrations and differing wavefront aberration strengths includes holographic images made with reference beams of differing angular disposition.

13. The method of generating a wavefront-corrected optical output image from a phase-aberrated input optical image of claim 10 wherein one of said collecting and said reconstructing steps includes communicating optical images through a stacked plurality of different phase correction holographic diffraction gratings.

14. The method of generating a wavefront-corrected optical output image from a phase-aberrated input optical image of claim 10 wherein one of said collecting and said reconstructing steps includes communicating optical images through a multiplexed multiple image phase correction holographic diffraction grating.

15. The method of generating a wavefront-corrected optical output image from a phase-aberrated input optical image of claim 10 wherein said phase correction holographic diffraction grating includes one of a multiplexed single diffraction grating and a stack of differing individual diffraction gratings.

16. The method of generating a wavefront-corrected optical output image from a phase-aberrated input optical image of claim 10 wherein said phase correction holographic diffraction grating is one of a phase relief, a spatial-spectral and an intensity grating configuration and also comprises one of a reflection mode hologram and a transmission mode hologram.

17. The method of generating a wavefront-corrected optical output image from a phase-aberrated input optical image of claim 10 wherein said wherein said phase aberrated input optical image includes atmospheric generated phase aberrations.

18. A high speed optical processing method of generating a wavefront-corrected optical output image from a phase-aberrated input optical image, said method comprising the steps of:

generating a planar phase correction holographic diffraction grating having a plurality of differing holographic image patterns each inclusive of a combined input beam and a reference beam of differing angular orientation for each holographic image pattern;

said plurality of differing holographic image patterns each representing a possible phase aberration and a phase aberration magnitude present in said input optical image;

forming an image representing said phase-aberrated input optical image on a planar input port surface of said phase correction holographic diffraction grating;

projecting a plurality of phase corrected output image components from said phase correction holographic diffraction grating onto a selected distinct location of a distant arrayed detector surface in response to which possible phase aberration and aberration magnitude is included in said phase-aberrated input optical image; and reconstructing said input optical image in phase aberration-reduced optical output image form from said projected output image components.

* * * * *